No. 735,437.

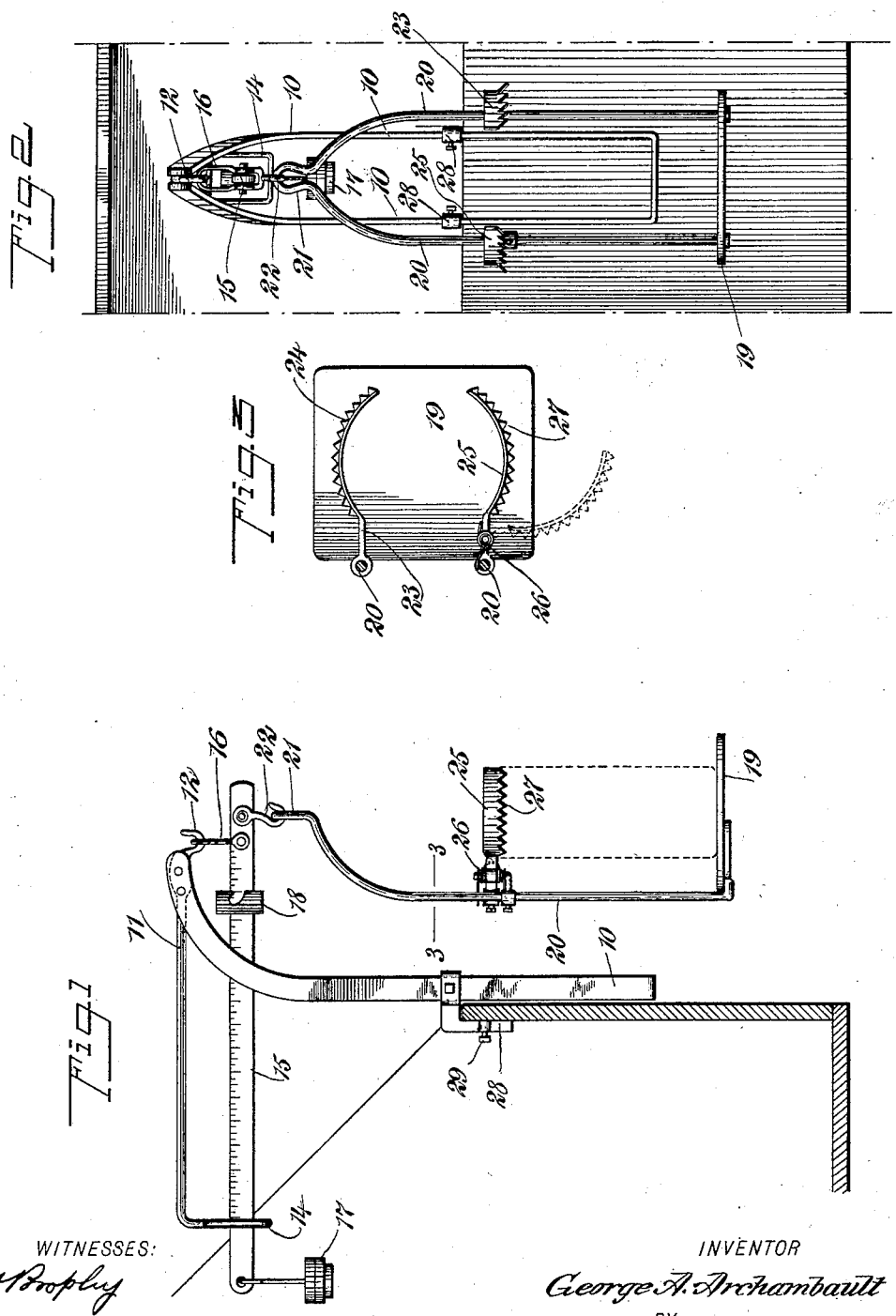

Patented August 4, 1903.

UNITED STATES PATENT OFFICE.

GEORGE ANTOINE ARCHAMBAULT, OF CLARE, MICHIGAN.

SACK-SCALE.

SPECIFICATION forming part of Letters Patent No. 735,437, dated August 4, 1903.

Application filed June 13, 1902. Serial No. 111,477. (No model.)

*To all whom it may concern:*

Be it known that I, GEORGE ANTOINE ARCHAMBAULT, a citizen of the United States, and a resident of Clare, in the county of Clare and State of Michigan, have invented a new and Improved Scale and Bag-Holder, of which the following is a full, clear, and exact description.

This invention relates to a means for facilitating the filling and weighing of bags of grain and other material taken from a hopper, wagon, or like receptacle.

It comprises a supporting-frame which is capable of adjustable attachment to the bin, wagon, or the like and which carries the scale-beam. To the scale-beam is attached the bag-holding device. By means of this invention the grain may be shoveled readily into the bag and at the same time weighed, after which the bag may be tied and a second filled, the work being carried on quickly and with the utmost convenience.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a side elevation of the invention. Fig. 2 is a front elevation thereof, and Fig. 3 is a sectional plan view on the line 3 3 of Fig. 1.

The supporting-frame comprises two vertically-disposed bars 10, which converge at their upper ends and are turned laterally, so as to form an outwardly-projecting crane-like structure, as shown in Fig. 1. Between the upper ends of the bars 10 is fastened rigidly a bar 11, one end of which terminates just outward from the ends of the bars 10 in a hook 12 and the other end of which is projected horizontally to the left (see Fig. 1) and terminates in a loop 14. The scale-beam 15 is fulcrumed on the hook 12 by means of a link 16, and its long arm passes through and is allowed limited movement by the loop 14. The scale-beam 15 is fitted with the usual weights 17 and pea 18, as shown. The bars 10 are provided with brackets 28, which are adjustable thereon, and these brackets are adapted to engage the bin or other supporting-body, as Fig. 1 illustrates.

29 indicates set-screws or other fastening devices for securing the brackets to the bin.

The bag-holder comprises a platform 19, which is carried by two rods 20, these rods converging at their upper ends into an eye 21, which is hung from the short arm of the scale-beam by a hook 22. On one of the rods 20 is fastened rigidly the horizontal arm 23, which projects out over the platform 19 and has serrations or teeth 24 thereon to engage the bag. On the other rod 20 an arm 25 is mounted to swing and is normally thrown outward, as the dotted lines in Fig. 3 illustrate, by a spring 26.

27 indicates serrations or teeth on the arm 25 similar to the serrations 24. The bag is rested on the platform 19, and the arms 23 and 25 are introduced into the mouth of the bag, the teeth 24 and 27 engaging the bag to hold it in position, as the dotted lines in Fig. 1 illustrate.

In the use of the invention the parts are adjusted as shown in Fig. 1, and after the bag is in place it may be conveniently filled. When the proper weight of material has been shoveled into the bag, the bag may be tied and removed and a second bag placed in position. It will be observed that the bag-holder may be removed from the hook 22, and any object may be weighed on the beam 15 after the manner of the usual steelyards.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. The combination of two vertically-disposed supporting-bars converging toward each other at their upper ends, a horizontally-disposed bar fastened to and between the upper ends of said supporting-bars, a scale-beam lying under the bar and hung from one end thereof, the other end of the bar having a downwardly-projected guide device coacting with the long arm of the scale-beam, and means hung from the short arm of the scale-beam for carrying the material to be weighed.

2. The combination of two vertically-disposed spaced supporting-bars located side by side and converged toward each other at their upper ends, a scale mechanism carried on the upper parts of said bars, and a bracket attached to each supporting-bar and adapted to engage the upper edge of a bin or the like whereby to sustain the supporting-bars.

3. The combination of two vertically-disposed spaced supporting-bars located side by side and converged toward each other at their upper ends, a scale mechanism carried on the upper parts of said bars, and a bracket attached to each supporting-bar and adapted to engage the upper edge of a bin or the like whereby to sustain the supporting-bars, said brackets extending inward and downward over the edge of the bin to securely engage therewith.

4. The combination of two vertically-disposed supporting-bars spaced from each other at their lower portions, scale mechanism mounted on the upper portions of said bars, and a bracket attached to the lower portion of each supporting-bar and adapted to engage the upper edge of a bin or the like whereby to sustain the supporting-bars.

In testimony whereof I have signed my name to this specification in the presence of two subscribing witnesses.

GEORGE ANTOINE ARCHAMBAULT.

Witnesses:
O. B. THAYER,
GEORGE ACKLEY.